June 16, 1964  C. E. GREEN  3,137,362
ANECHOIC SONAR CALIBRATION POOL
Filed March 27, 1961  3 Sheets-Sheet 1

INVENTOR.
CHARLES E. GREEN
BY
ATTORNEYS

June 16, 1964
C. E. GREEN
3,137,362
ANECHOIC SONAR CALIBRATION POOL
Filed March 27, 1961
3 Sheets-Sheet 2
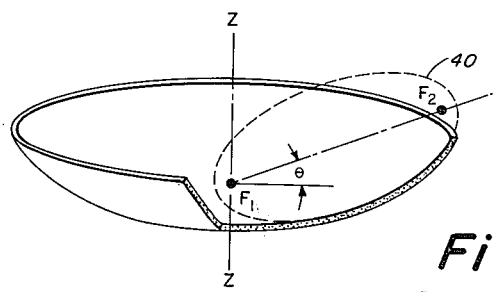
Fig. 4
Fig. 5
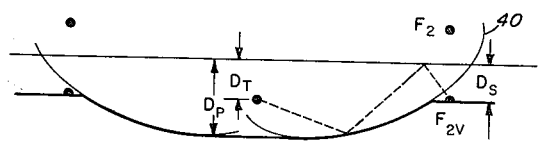
Fig. 6
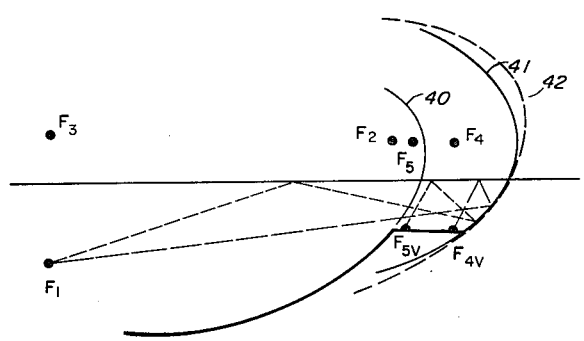
INVENTOR.
CHARLES E. GREEN
BY
ATTORNEYS June 16, 1964  C. E. GREEN  3,137,362
ANECHOIC SONAR CALIBRATION POOL
Filed March 27, 1961  3 Sheets-Sheet 3

0° LOBE  a

22° LOBE  b

180° NULL  c

RIM OF POOL
EDGE OF BOWL
BOTTOM CENTER OF POOL

INVENTOR.
CHARLES E. GREEN
BY

ATTORNEYS

United States Patent Office 3,137,362
Patented June 16, 1964

---

3,137,362
ANECHOIC SONAR CALIBRATION POOL
Charles E. Green, San Diego, Calif., assignor to the United States of America as represented by the Secretary of the Navy
Filed Mar. 27, 1961, Ser. No. 98,719
16 Claims. (Cl. 181—.5)
(Granted under Title 35, U.S. Code (1952), sec. 266)

The invention described herein may be manufactured and used by or for the Government of the United States of America for governmental purposes without the payment of any royalties thereon or therefor.

The present invention relates in general to acoustical chambers and in particular is an anechoic sonar test pool for calibrating acoustical and sonar apparatus in a substantially isolated acoustical environment where adverse ambient boundary surface reverberations are not present.

Ordinarily, test and calibration of acoustical equipment (such as sonar sets, for example) with a great deal of accuracy presents a difficult problem in that the energy being received by the device being calibrated is mixed and cluttered with noise signals, false signals, and foreign signals due to various and sundry boundary surface reverberations from the container or chamber being used as the test environment. In general, it has been found that large bodies of water such as deep natural lakes are satisfactory for some test purposes, but it is also known that it is extremely difficult, if not impossible, to completely control such environments to delete the unwanted inherent spurious signals and sounds therefrom. Consequently, judicious care must be employed in evaluating sonar calibration data obtained under such environmental circumstances, or the results will be of little value, if any. This, of course, requires the services of highly trained, high caliber personnel for distinguishing and sifting the pertinent and useful signal data from the impertinent, interference, and useless signal data.

In order to effect more laboratory-like conditions, a number of test tanks have been developed that are effective for many purposes and which provide acoustical test and calibration environments which in some degree approach the simulation of conditions found in an ocean of sea water of effectively infinite extent. Unfortunately, such prior art test tanks have considerable room for improvement if substantial acoustical isolation is desired within the test medium or area, due to the fact that reverberated signals of sufficient magnitude to interfere with the actual test signals usually occur and thereby complicate the evaluation thereof and the acoustical equipment being calibrated.

The subject invention overcomes most of the operational defects encountered in known prior art acoustical calibration facilities by the simple but profound expedient of providing a pool having a unique combination of shape, reflecting wall surfaces, acoustical trap locations and profiles, water-container interface contours, and structural materials which substantially attenuate and dissipate unwanted acoustical energy once it has arrived at predetermined boundary locations. Hence, for most practical purposes, energy reverberations are substantially removed from the actual test area, with those remaining, if any, being only of negligible consequence, as will be shown subsequently.

It is, therefore, an object of this invention to provide an improved anechoic chamber.

Another object of this invention is to provide an improved test environment for testing and calibrating acoustical, electromagnetic, and light energy radiating and receiving equipment.

A further objective of this invention is to provide a sonar calibration test pool which reflects only a negligible amount of sonic energy from the boundaries thereof.

Another object of this invention is to provide improved means for accurately obtaining and measuring broadband acoustical beam patterns.

Another object of this invention is to provide an improved method of constructing a sonar test pool.

Still another objective of this invention is to provide a calibration tank which facilitates the testing of sonar and other transducers under predetermined simulated operational and environmental conditions.

A further objective of this invention is to provide a means whose construction substantially prevents the rendering of false and unreliable tests of sonar and other transducers due to reverberation and reflection of the energy being employed therein.

A still further objective of this invention is to provide an improved transducer calibration environment wherein the energy intended to be directed to a receiving transducer will reach same with only negligible interference, if any, from reverberations thereof.

Another object of this invention is to provide an auditorium chamber having regulated acoustics.

Other objects and many of the attendant advantages of this invention will be readily appreciated as the same becomes better understood by reference to the following detailed description when considered in connection with the accompanying drawings in which like reference characters designate like parts throughout the figures thereof and wherein:

FIG. 4 is a representative bowl of the type that may be generated by revolving the ellipse of FIG. 3 about an axis.

FIG. 5 is a diagrammatical view of a cross-section of the central bowl generated by the use of the ellipse of FIG. 3 with end shelves attached and critical points located.

FIG. 6 is a schematic view of the formation of the rim or edge of the subject pool with pertinent ellipse foci and representative energy rays incorporated therein.

Figure 1:
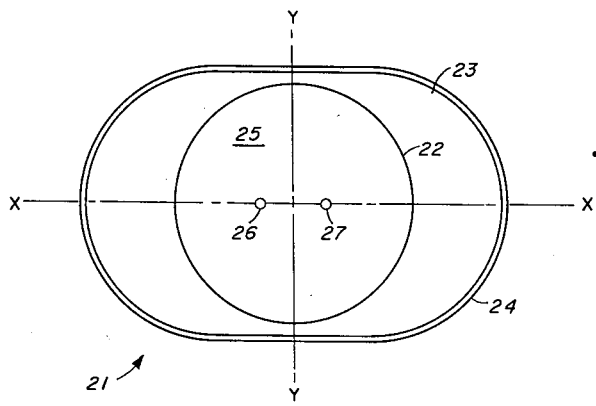
FIG. 1 is a top diagrammatical view of a preferred embodiment of the anechoic sonar calibration pool constituting this invention.

Referring now to FIG. 1, there is illustrated an elongated or oblong embodiment 21 of the anechoic pool constituting this invention as having a circular shaped bowl 22, a shelf-like acoustical energy trap 23, a rim 24 which is partially straight edge in shape and partially semicircular in shape as viewed from the top. Bowl 22 and shelf 23 contain any preferred environmental medium which is suitable for the propagation of sonic, light, heat, or electromagnetic energy, or the like therethrough. Such environmental medium may, for example, consist of liquid or gaseous fluids such as fresh water, sea water, air, or other comparable elements. In the herein disclosed embodiment, however, bowl 22 and shelf 23 contain a pool of water 25 adapted for having the equipment or a portion thereof submerged therein for test or calibration purposes.

A pair of sonar transducers 26 and 27 are disposed within said water at or near the center of bowl 22. One of said transducers is ordinarily considered to be a transmitting transducer and the other a receiving transducer inasmuch as they are respectively connected to sonar transmitters and receivers or other test instrumentation or apparatus. Obviously, any number of transducers may be employed to meet test requirements, and their exact positioning may be as necessary or as desired to provide the calibration data wanted. Although not shown in the drawing, said equipment may be suspended from a movable crane located on a bridge means spanning the entire pool in the $x-x$, $y-y$ or in any other desired direction. In addition, other equipment and instrumentation pertinent to operation of the subject pool and apparatus to be calibrated may be appropriately housed on said bridge means if desired.

Figure 2:
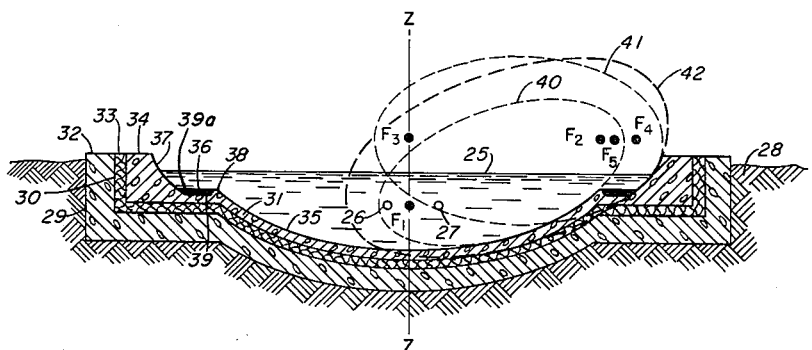
FIG. 2 is an elevational view in cross-section of the subject invention showing typical surface contours, structure, and materials incorporated therein.

FIG. 2 shows a detailed cross-section of anechoic sonar test pool 21 as being mounted on any appropriate support means 28, which may, for example, be the earth or a box or container structure having sufficient strength characteristics to properly hold the weight and pressures of the pool. A layer of reinforced concrete forms a lower retaining basin 29 and is of the order of six inches thick. A layer of tar of the order of two inches thick is disposed on top of lower retaining basin 29 to form an intermediate shock-absorbing, dynamic-cushion type support basin 30, which provides increased pool stability and structural strength, due to the reduced influence of ambient external geophysical or atmospheric conditions, such as temperature and pressure changes, vibrations, or the like. Of course, tar basin 30 also acts as a compliant layer that is capable of cold flow which will fill and seal any cracks that may inadvertently form in the concrete of the associated concrete basins. Floating on top of tar basin 30 is an upper reinforced concrete basin 31 which may be of the order of two inches thick and which may also be lined at its upper surface with any pertinent energy absorption and reflection material desired. Although concrete is disclosed herein as the preferred embodiment material for upper basin 31, it should be understood that any suitable material which contains the proper operational and strength characteristics and is susceptible to the required contour shaping may be used. Hence, such materials as plaster, metal, plastic, fiberglass, plaster of Paris, or any appropriate sounding absorbing, transmitting or reflecting materials, or the like, may be combined with each other, with steel, or other reinforcing materials and may be employed as convenient. Likewise, the bottom basin may be composed of such materials, too, if found to be more expedient than reinforced concrete. Moreover, suitable equivalent resilient materials may be substituted for tar as the material of intermediate basin 30, and this disclosure should be considered as teaching the use thereof.

Each of the aforementioned lower, intermediate, and upper basins is shown to have peripheral retaining walls 32, 33 and 34, respectively, which are substantially vertical. However, said walls may be dish-shaped or otherwise formed to fit any environmental condition and still be strong enough to support the entire spool structure in its predetermined geometrical configuration. One exception to this is the inside surfaces of the upper basin. These surfaces must be constructed in such manner as to provide particular and unique contours, which are properly interrelated to effect the various absorptive and reflective objectives of the invention. The explanation of the construction of said contoured surfaces will be presented in structural detail below and in theory subsequently.

Upper basin 31 may be divided into three very important surface sections. These sections include a curved bowl surface 35, a shelf surface 36, and a curved rim surface 37, each of which has its own unique form and location. Bowl 22 occupies the center portion of the pool and is the place where transducers 26 and 27 are located. The periphery or edge of said bowl contains a lip 38 which extends downwardly from bowl surface 35 to a substantially horizontal flat 39 which is lower in height than said bowl periphery. The outermost continuation of flat 39 becomes rim surface 37. Disposed on top of flat 39 between lip 38 and rim surface 37 is a layer of energy absorbent material $39a$ which may, for instance, be composed of mud, concrete wedges, acoustic scatterers, or rubber compounds, or any other material which will absorb sound, heat, light, electromagnetic energy, or the like, depending on the use to which the subject chamber is being put.

Water 25, of course, substantially fills the entire pool.

As cursorily shown in FIG. 2, and theoretically explained in considerable detail in conjunction with FIGS. 3 through 6, an ellipse 40 having foci $F1$ and $F2$ is used to generate a segment of bowl surface 35. Focus A1 is positioned on the center axis $Z-Z$ of bowl 22 and focus $F2$ is positioned above the surface of water 25 a distance that is half as great as the distance $F1$ is below the surface of said water. However, because Focus $F2$ is not actually limited in its disposition to a position above the water surface a distance that is half as great as the distance $F1$ is below the surface thereof, it may also be placed at a distance above the surface of the water that is equal to the depth the top surface of the mud or other energy absorbent material is located below the surface of the water, or placed at a point located contiguously with said top surface. Horizontal revolution of ellipse 40 about axis $Z-Z$ then generates the elliptical segment constituting bowl surface 35. Likewise, an ellipse 41 having foci $F3$ and $F4$ is used to generate rim surface 37. $F3$ is also located on axis $Z-Z$ above the surface of the water as far as $F1$ is located below the surface thereof, and $F4$ is located in a plane passing through $F3$ and parallel with the surface of the water or, in the alternative, it may be located at a distance above the surface of the water that the top surface of the energy absorbing shelf material, or a point contiguous therewith, is located below the surface of said water.

If so desired, another ellipse 42 may be employed to generate a rim surface that is identical with rim surface 37. The foci of ellipse 42 are located at $F1$ disposed below the water surface and $F5$ which is disposed above the surface of the water a distance equal to half the distance $F1$ is disposed below the surface of said water. Or, again in the alternative, $F5$ may, instead, be disposed a distance above the surface of the water equal to the depth the top surface of the mud or other energy absorbent material is located below the surface of the water or, likewise, at a place contiguous with said top surface.

The theory of operation of the subject invention is as follows:

The transducers or other equipment used in the calibration process are appropriately positioned at a predetermined pool depth at, near, or around center axis $Z-Z$ as desired to provide any given direct travel path between the transmitter and receiver transducer elements. Although any preferred arrangement will function well for many practical purposes, optimum efficiency, as far as reverberation interference is concerned, ostensively occurs when the transmit and receive transducers are spaced close together relative to the overall size of the entire pool structure and near the aforesaid axis $Z-Z$. Moreover, in event that said transducers have some directional characteristics rather than being omnidirectional, the axis of maximum power (or anticipated maximum power if the radiation pattern thereof is unknown) should be aligned with the major axis of the pool structure so that the radiation pattern of the transmitted energy is directed for the most part toward that part of the pool structure containing the largest shelf area, in order to provide optimum reverberation nullification. Hence, it can also be seen that the design length of that portion of said shelf which is in alignment with the maximum power portion of the energy radiation pattern, is a matter of choice of the artisan and is contingent upon and, in the final analysis, determined by the particular type of equipment to be tested. It has, therefore, been found that, the greater the radiation power in any particular direction, the longer the shelf must be in that direction in order to attenuate and trap that spurious energy which would otherwise be reflected back into the test area. Obviously, the entire anechoic pool structure should be made sufficiently large to take care of all anticipated high power equipment to be tested, since such is the design criterion or limiting factor, and inasmuch as the calibration of equipment of lesser power would not be adversely affected by having a pool that is too large, so to speak.

Figure 3:
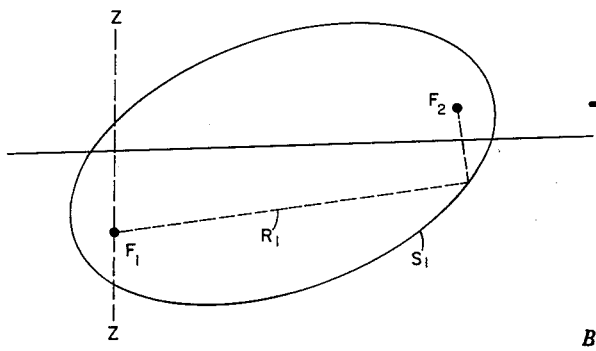
FIG. 3 is a theoretical diagram of the manner in which a part of the concave surface contour of the bowl portion of the subject invention is generated by means of a sector of an ellipse.

Assuming for the purpose of theoretical discussion that acoustical energy, electromagnetic energy, and light energy travels in rays and that in the preferred embodiment an acoustical energy ray R1 travels from a sound source located at one of the foci of a plane ellipse such as F1 of FIG. 3. If a physical surface S1 is generated by rotation of said ellipse about an axis of revolution Z—Z passing through focus F1, the other of focus F2 thereof will form a circle within a plane and said generated surface forms a portion of a bowl. Now, if focus F1 is located below the surface of a pool of water at twice the distance that focus F2 is located above the surface of said water, then any sound such as that represented by R1 originating at focus F1 will be reflected from said generated elliptical surface and tend to pass out of the water and through focus F2, as is illustrated in FIG. 3, or be reflected by the surface of the water toward the virtual image of focus F2.

If, for instance, the generation of said elliptical surface is discontinued or terminated near axis Z—Z and continued as a gradual progressive projecting surface which contacts said Z—Z axis at a right angle, a bowl of the type essentially shown in FIG. 4 is obtained. This bowl is unique in that most of the energy radiated from an omnidirectional source strikes the concave surface thereof and reflects therebetween and the water surface toward the circumference of the circle circumscribed by focus F2, and only a negligible amount of energy is not so reflected. Of course, it should be understood that it is unnecessary to discontinue said elliptical section in the vicinity of the aforesaid Z—Z azis, and, in some instances, it may even be preferred to allow portions of said revolved elliptical section to converge to form a surface apex on said axis, rather than being discontinued to form a projecting surface normal thereto.

If the aforementioned bowl surface obtained by generation of said ellipse of revolution is discontinued in such manner that the periphery thereof has a radius that is shorter than the radial distance between axis Z—Z and focus F2, and if a shelf extension is attached to said periphery, as is illustrated in FIG. 5, the aforesaid reflected energy is reflected onto the upper surface of said shelf, where it may be partially absorbed by the previously disclosed absorbent trap material at F2v, the virtual image of F2.

Consider now the various relative parameters. For the sake of using dimensionless units, the operational depth of the transducers will be given as unity and all other dimensions will be referred to this distance due to the relativity thereof therewith.

One of the critical parameters involved is the depth of the pool (Dp). If the bottom were a perfect reflector, F1 might be located at a half-depth position; however, where the bottom is absorptive, the effective depth actually falls below the real depth, and further concerns a problem of acoustic loading. But, since the actual or effective depth is a controllable parameter, no insurmountable problem occurs.

Another parameter is the transducer depth (Dt), which is usually found to be optimum at half of the pool depth.

Another controllable parameter is the depth below the water surface of the shelf area (Ds), where, for the most part, energy absorption takes place. It has been found that these three parameters are crictically related and an important factor in determining bowl diameter. Of course, other factors such as volume of water, distance separating the transducers, test frequency range and test power being used must also be considered in determining actual overall size and dimensions, but inasmuch as relative dimensions appear to be more critical from an invention standpoint, it will be left to the design skill of the artisan to decide how big or small the overall test pool should be made, and only the relative dimensions will herein be provided.

The following table shows a number of preferred relationships of the aforementioned parameters. All dimensions given, as previously mentioned, are related to the operational transducer depth with same being unity or 1.0.

|  | Radius of Bowl as a Function of Pool and Shelf Depths | | | | |
| --- | --- | --- | --- | --- | --- |
| Pool Depth (Dp): | | | | | |
| 1.6 | 2.9 | 2.7 | | | |
| 1.7 | 3.4 | 3.1 | 3.0 | 2.8 | 2.6 |
| 1.8 | 4.0 | 3.7 | 3.4 | 3.2 | 3.0 |
| 1.9 | 4.6 | 4.2 | 3.9 | 3.7 | 3.5 |
| 2.0 | | 4.8 | 4.5 | 4.2 | 4.0 |
| Shelf Depth (Ds) | .50 | .55 | .60 | .65 | .70 |

For example, a pool depth of 1.6 means the depth of water is 1.6 times the distance from the surface of the water to the transducers, and a shelf depth of .5 means it is half as deep as the transducers. The corresponding figures in the table represent the horizontal radius of the pool for respective pool and shelf depth, with said radius being measured from the Z—Z axis to the rim of the bowl.

Because the surface of the water is above the top level of the bowl, the container periphery or rim must be considered. Again, the theoretical application of an ellipse of revolution about axis Z—Z is used with this ellipse having a greater distance between foci than the previously mentioned ellipse. This second ellipse is actually a variable size ellipse with the distance between foci likewise being variable to accommodate any pattern necessary to provide any desired geometrical configuration and concomitantly taking care of reverberation attenuation. Thus, if it is desired to make the pool substantially oblong in shape, having a longitudinal major axis in one direction which is longer than a minor axis normal thereto, the distance between foci must be varied accordingly as the ellipse is revolved about axis Z—Z. The factor to be considered in this instance, of course, is shelf distance or area in any particular direction as dictated by the directional characteristics of the transducers being tested. Obviously, any structural or geometrical configuration may be used, but for all practical purposes, it has been found that the greater the shelf distance or area, the greater the energy attenuation. Thus, if a given transducer has directional charcteristics, it should be understood that it should be mounted for energy transmission along the longitudinal major axis of an oblong pool, if possible, because reverberation attenuation would be effected to a greater extent in that direction. On the other hand, if the transducers being tested are omnidirectional, perhaps a circular pool with uniform shelf distance or area would be more desirable. Again, as long as the herien disclosed parameter relationships and surface contours are substantially maintained, size and geometrical configuration may be a matter of preferred selection, and reverberation attenuation will be effected sufficiently to provide a substantially anechoic test pool.

Now, as shown in FIG. 6, another surface is generated from a portion of said second mentioned ellipse. This surface is the rim, and the portion of the ellipse selected to generate it should be that which will effectively reflect any sonic energy contacting same, which originated at one of the transducers or its virtual image, toward the virtual images of said ellipses, which, of course, are disposed in the absorbent shelf area. For the sake of clarity, two representative rays are shown as emanating from the vicinity of F1, one striking the concave surface of said outer rim, and being reflected or re-reflected toward the virtual image of one of the foci of said second mentioned ellipse, and the other reflecting from the water surface prior to reflections from the outer rim. Depending on the length of the shelf, the sound energy may bounce back and forth between the surface of the water and the absorbent shelf either before or after reflection by said outer rim surface, and so doing causes it to be attenuated or "beat-to-death," so to speak, since each reflection and each bit of travel reduces its energy level until it is practically zero. Again, it should be understood that the efficiency of the absorption shelf is contingent on its size and the absorption material used. The more perfect the absorbent shelf material, the less shelf area required, and, theoretically, if a perfect absorber can be used, then a minimum shelf flat will only need to extend horizontally half the distance of the depth of the transducer. Otherwise, a longer shelf is necessary; that is, one that is large enough to encompass all virtual images.

Where two transducers are used, the preferential energy propagation direction is established and the shelf extended further in this direction, thereby forming an elongated pool. Although for many purposes the transducers may be located at substantially the center of the pool (F1), sometimes it is necessary to separate them in order to perform the desired calibration. Because the virtual image (F4v) of the reflected energy moves further into the shallow shelf for the same elliptical curvature as the transmititng transducer is moved away from the center of the bowl, it may be necessary to compensate for this fact by further elongating the shelf.

Briefly, the actual operation of the anechoic sonar test pool is essentially as follows:

A transmitting transducer and receiving transducer are positioned as desired in the subject tank. As the transmitting transducer broadcasts its sonic energy, it is conducted to the receiving transducer by means of the water or other fluid medium in the pool. That energy which travels in a direct path toward the receiving transducer provides the calibration signals, while that energy not received directly by the receiving transducer travels through the water to either the surface of the water, the surface of the bowl, or the surface of the outer rim. Upon reaching anyone of these surfaces, said energy is reflected, and then perhaps re-reflected by another of said surfaces, and so on, until it is trapped at substantially the virtual image position of the rim forming ellipse located in the absorbent material disposed at the shelf.

Assuming, for instance, that transducer 26 is the transmitting transducer and that it is broadcasting acoustical energy toward receiving transducer 27 in the anechoic pool of FIG. 2. Then any sonic pressure rays which are not in the direct path of receiving transducer 27, continue in their respective travels until they are reflected into the sound trap at the pool shelf. Upon reaching the sonic trap, said rays are either absorbed by the absorbent material contained therein or reflected back and forth between the sound trap and the surface of the water until attenuated in the immedate vicinity thereof. This attenuation effect occurs because each of said reflections reduce the energy level of the sonic energy until it is practically dissipated in the water in that area or in the trap, thereby eliminating most of the spurious energy that might otherwise reverberate back to both the transmitting and receiving transducers and interfere with the signal transmission therebetween and, consequently, the calibration thereof.

Figure 7:
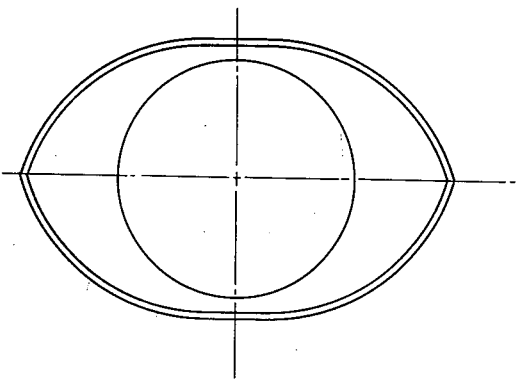
FIG. 7 is plan view of another preferred embodiment of the invention showing somewhat pointed ends.

At lower frequencies, the geometrical configuration of the subject pool, as viewed from the top, may become somewhat critical, in that the outermost wall may become a reflector where the cross-section of the elliptical sector is a fraction of a wavelength. To reduce such low frequency reflections or reverberations to substantially a negligible quantity, the semi-circular ends may be replaced with ends that have been reshaped to be more pointed, as depicted diagrammatically in FIG. 7. This contour tends to scatter the energy more and, for most practical purposes, eliminates the low frequency end reflection problem, and the spreading loss due to distance and partial absorption is sufficient to permit valid response test runs between close-mounted transducers. Otherwise, this embodiment operates essentially like the embodiment of the subject invention having semi-circular ends.

Figure 8:
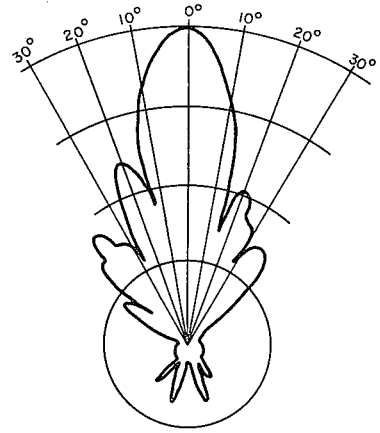
FIG. 8 is a representative acoustical energy pattern used in determining the anechoic properties of the subject invention.
Figure 8:
Figure 8:

FIG. 8 illustrates a representative acoustical energy radiating pattern which emanates from the transmitting transducer. As can readily be seen, in this instance, it has predetermined directional characteristics; however, as previously mentioned, this factor need be no cause for undue concern or alarm because the proper shelf construction will adequately take care of all but a negligible amount of sonic reverberations, and, as a result, no deleterious effects will occur during equipment calibration.

Figure 9:
FIG. 9 shows a plurality of oscilloscope images of signals received in the subject invention when the acoustical energy pattern of FIG. 8 is broadcast at three different angles therein.
Figure 9:
Figure 9:

Consider now FIG. 9 in conjunction with the energy radiation pattern of FIG. 8 for an illustration of an actual test run in the subject invention and oscilloscope pictures of the results thereof. The zero degree signal image of FIG. 9(a) is the pulse waveform received by the receiving transducer when the transmitting transducer is broadcasting power directly thereat or at zero degrees, and for our purposes here is considered to be the reference image. Due to the fact that the transmitting and receiving transducers are closer to each other than the receiving transducer is to the periphery of the pool, reverberations of transmitted sonic energy, if any, would appear in this image at a time subsequent to initial pulse. At the zero degree transducer position it can be seen that little or no reflected energy has been received at the receiving transducer, indicating that, for all practical purposes, the pool is truly anechoic when used in this manner.

If the transmitting transducer is rotated so that the twenty-two degree lobe of the energy radiation pattern of FIG. 8 is in line with the receiving transducer and the level thereof is increased approximately 20 db or sufficiently to compare with the power of the zero degree reference lobe of FIG. 9(a), and extremely minute quantity of reflected energy 43 is received by the receiving transducer a short time after the initial transmission pulse, as is shown in FIG. 9(b).

If the transmitting transducer is again rotated so that the one hundred and eighty degree lobe or position of the energy radiation pattern of FIG. 8 is in line with the receiving transducer and the level thereof increased approximately 40 db or sufficient to be comparable with the level of the zero degree reference lobe of FIG. 9(a), only a small amount of reflected energy 44 is received by the receiving transducer a short period of time after the initial transmission pulse, as is shown in FIG. 9(c).

In analyzing the waveforms of FIGS. 9(a), 9(b), and 9(c), it would appear that no reverberations occur at the reference zero degree lobe position, small but inconsequential reverberations occur at the twenty-two degree position as a result of reflections from the edge of the bowl and perhaps the rim of the pool, and only a negligibly effective quantity of reverberations occur at the one hundred and eighty degree position as a result of reflections from the center of the bottom of the pool, the edge of the bowl, and the rim of the pool. These spurious reverberations are too small in number and amplitude, however, to have any adverse effect on the received signal or the data derived therefrom during the sonar equipment calibration process. Even the layman can easily distinguish between real test signals and reverberations without difficulty, which obviously facilitates analysis of calibration data thereby or by trained scientific personnel as well. Moreover, the resulting data obtained from use of this invention during calibration of sonar devices are much more accurate and of considerably greater value than that ordinarily obtained in natural bodies of water or prior art test tanks.

Although, the foregoing prepared embodiments relate to an anechoic sonar test pool wherein the energy employed for calibration purposes is acoustical in nature, it should be understood that incorporating a few well known design changes would facilitate its being used as a chamber for testing electromagnetic equipment. For instance, if the aqueous fluid or water were replaced with air, another fluid, or a medium representing atmospheric or space environmental conditions, electromagnetic energy could be propagated therein and directed by the chamber shape to provide a substantially isolated test tank. Furthermore, a similar isolated test chamber would be effected to a considerable degree without the presence of an aqueous medium such as water, even though sonic or pressure energy were being employed in the calibration process, due to the disclosed structural surface forms and materials thereof. Thus, the acoustics thereof may be so controlled as to provide an improved auditorium where human listeners may receive the full benefit of the sound being transmitted from any given source properly located within the structure without the adverse effects of excessive echoes, reverberations, reflections, beats, and the distorted sounds produced thereby. Likewise, if so desired, energy having other appropriate wavelengths such as, for example, light may be used in conjunction with the chamber constituting this invention with equally advantageous results, if the surfaces involved were made sufficiently reflective and absorptive, respectively. It is, therefore, to be understood that although the preferred embodiments disclosed herein represent an anechoic test chamber for underwater test and calibration of sonar apparatus, that it is not to be so limited, inasmuch as the subject structure is also an "anechoic" chamber to other forms of energy as well and may be easily adapted therefor by one skilled in the art from the teachings herein provided.

Obviously, many modifications and variations of the present invention are possible in the light of the above disclosure. It is, therefore, to be understood, that within the scope of the appended claims, the invention may be practiced otherwise than as specifically described.

What is claimed is:

1. An anechoic chamber having a substantially pseudo infinite field for vibrational energy waves comprising in combination, a bowl having a concave curvilinear surface, a shelf attached to the peripheral edge of said bowl, and a rim having a concave curvilinear surface mounted on said shelf at the outer edge thereof.

2. An anechoic sonar calibration pool comprising in combination, a circular bowl, said bowl having a concave curvilinear surface, a flat shelf attached to the peripheral edge of said bowl, a rim mounted on the outer periphery of said shelf, said rim likewise having a concave curvilinear surface, and water disposed within the limits of said outer rim in sufficient quantity to completely flood said bowl and said shelf.

3. An anechoic chamber comprising in combination, a circular bowl, said bowl having a concave surface defined by a first elliptical sector being rotated about an axis of revolution, a shelf attached to the outer periphery of the concave surface defined by said first elliptical sector, and a rim having a concave surface generated by rotating a second elliptical sector about said axis of revolution mounted on said shelf at the outer edge thereof.

4. An anechoic chamber comprising in combination, a circular bowl having a concave-curved surface portion of which is generated by rotating a first ellipse about an axis of revolution passing through one focus thereof with the other focus thereof located above a predetermined plane a distance which is half the distance said one focus is located below said predetermined plane, a flat shelf substantially paralleling said predetermined plane attached to the outer periphery of said circular bowl, and a rim having a concave-curved surface mounted on said shelf at the outer edge thereof, said concave-curved surface having a portion thereof generated by rotating a second ellipse about said axis of revolution with one of the foci thereof coincident therewith and the other of the foci thereof passing through a second plane that is parallel to said predetermined plane and passes through said one of said foci.

5. An anechoic chamber comprising in combination, a bowl, said bowl having a surface profile which is defined by a sector of a first ellipse, a shelf attached to the outer edge of said bowl, said shelf having a predetermined flat surface area with all portions thereof facing toward the same direction faced by the concave-curved surface portion of said bowl and with all portions thereof lying in the same plane, and a rim attached to the periphery of said shelf having a surface sector that is elliptically curved in such manner that any energy received thereby will be effectively reflected toward the virtual image thereof or out of the chamber.

6. A pseudo-infinite field adapted for use in calibrating sonar apparatus comprising in combination, a bowl, said bowl having a circular periphery and a surface contour defined by an elliptical sector, a shelf attached to the circular periphery of said bowl in the plane thereof, a rim mounted on the outer edge of said shelf, a pool of aqueous fluid confined by the boundary of said rim of sufficient depth to entirely fill said bowl and flood said shelf, said rim having a surface profile that is elliptically curved in said manner that acoustical energy received thereby is effectively reflected toward the virtual image of one of the foci thereof, and means attached to said bowl, said shelf, and said rim for supporting same in the aforesaid relationship.

7. The device of claim 6 wherein said bowl, said shelf, and said rim are concrete.

8. The device of claim 6 wherein said bowl, said shelf, and said rim are plastic.

9. The device of claim 6 wherein said bowl, said shelf, and said rim are fiberglass.

10. The device of claim 6 wherein said bowl, said shelf, and said rim are of energy absorbing material.

11. The device of claim 6 wherein said pool of aqueous fluid is water.

12. The device of claim 6 wherein said means attached to said bowl, said shelf, and said rim for supporting same include a concrete basin, and a tar basin interposed therebetween.

13. An anechoic sonar calibration pool comprising in combination, a bowl, said bowl having a circular periphery and a surface contour generated by rotation of an elliptical sector about an axis of revolution passing through the center of said circular periphery, a lip integrally connected to and extending downwardly from said circular periphery, a shelf attached to said lip, said shelf having a flat surface lying in a plane disposed between the circular periphery and bottom of said bowl and normal to said axis of revolution, a rim mounted on the outer edge of said shelf, a layer of sound absorbing material disposed on said shelf between said lip and said rim with the surface thereof substantially parallel to the surface of said shelf and flush with the extremity of said lip, said rim having a surface profile that is elliptically curved in such manner that any sound received thereby is reflected toward a focus thereof, a pool of water confined by the boundary of said rim for flooding said bowl and said layer of sound absorbing material at a depth sufficient for the surface thereof to re-reflect the sound reflected by said elliptically curved rim surface toward a virtual image of the aforesaid focus located within said sound absorbing material, and means attached to said bowl, said shelf, and said rim for supporting same in the aforesaid structural relationship.

14. The device of claim 13 wherein said layer of sound absorbing material disposed on said shelf between said lip and said rim with the surface thereof substantially parallel to the surface of said shelf and flush with the extremity of said lip is mud.

15. An anechoic chamber adapted for being used in calibrating sonar equipment comprising in combination, means having a circular periphery and a surface contour generated by rotation of an ellipse about an axis of revolution passing through the center of said circular periphery for containing an energy propagating medium, pressure energy trap means connected to the circular periphery of said last mentioned means, rim means having an inner surface profile that is elliptically curved in such manner that pressure energy received thereby is reflected toward a focus thereof or effectively re-reflected toward a virtual image of the aforesaid focus located within said trap means, and means connected to each of the aforementioned means for supporting same in the aforesaid combined relationship.

16. An anechoic chamber comprising a circular bowl having a concave surface portion which is generated by rotating a first elliptical sector about an axis of revolution passing through one focus thereof with the other focus thereof disposed above a predetermined plane a distance which is half that said one focus is located below said predetermined plane, a vibrational energy wave trap having a flat shelf substantially paralleling said predetermined plane attached to the outer periphery of said circular bowl, a rim surface having a concave profile extending across said predetermined plane which is generated by rotating a second elliptical sector about said axis of revolution with one focus thereof coincident therewith and the other focus thereof disposed in a second plane that is parallel to said predetermined plane, a medium for propagating vibrational energy wave motion confined by the boundary of said rim surface in such manner as to completely fill said bowl and at least flood said trap to a depth where the surface thereof coincides with said predetermined plane, and means attached to said bowl, said trap, and said rim surface for supporting same in the aforementioned structural and geometrical configuration.

References Cited in the file of this patent

UNITED STATES PATENTS

| | | |
|---|---|---|
| 1,726,499 | Noris | Aug. 27, 1929 |
| 1,857,641 | Johnson | May 10, 1932 |
| 2,503,400 | Mason | Apr. 11, 1950 |